Patented Mar. 15, 1927.

1,620,855

UNITED STATES PATENT OFFICE.

CHARLES E. F. AHLM, OF CLEVELAND, OHIO, ASSIGNOR TO AUTOMOTIVE PATENT HOLDING COMPANY, OF CLEVELAND, OHIO, A CORPORATION OF DELAWARE.

TRANSMISSION GEARING.

Application filed December 30, 1924. Serial No. 758,941.

This invention relates to transmission gearing such as used, for example, in automobile transmissions to secure a plurality of speeds between the motor and rear axle or driven member.

The gearing comprises essentially a gearing connection between driving and driven members including an internal external gear member mounted on an eccentric bearing and meshing internally with a spur gear rigid with one of the members and externally with a gear drivingly connected with the other. It also includes means for controlling the rotation of the eccentric bearing.

The general objects of the invention are to secure simplicity, cheapness of construction, and compactness consistent with strength whereby the weight of the parts is reduced to a minimum. Another object is to provide a mechanism for connecting relatively moving members together which may be easy and sure of operation yet which will not subject any of the parts of the gearing to sudden shock, or result in a noisy clashing when operated to change from one speed to another. A further object includes, in the arrangement of such a gearing, the provision of mechanism for controlling the eccentrically mounted internal external gear for accomplishing the reverse motion between the driving and driven member.

Further objects and advantages embodied in this invention will become apparent in the following description, having reference to the drawings wherein I have illustrated the preferred form.

Figure 1:
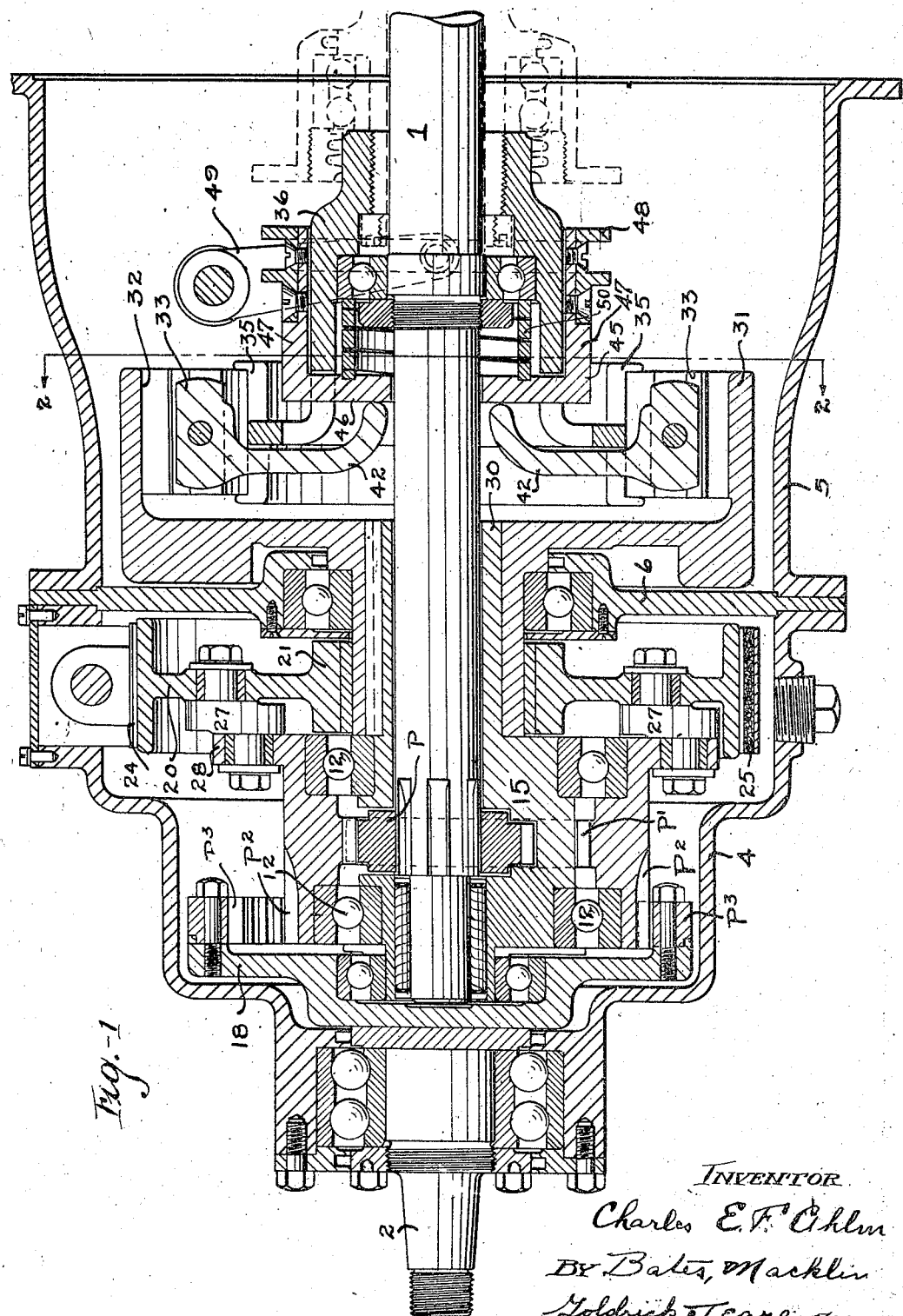
Figure 2:
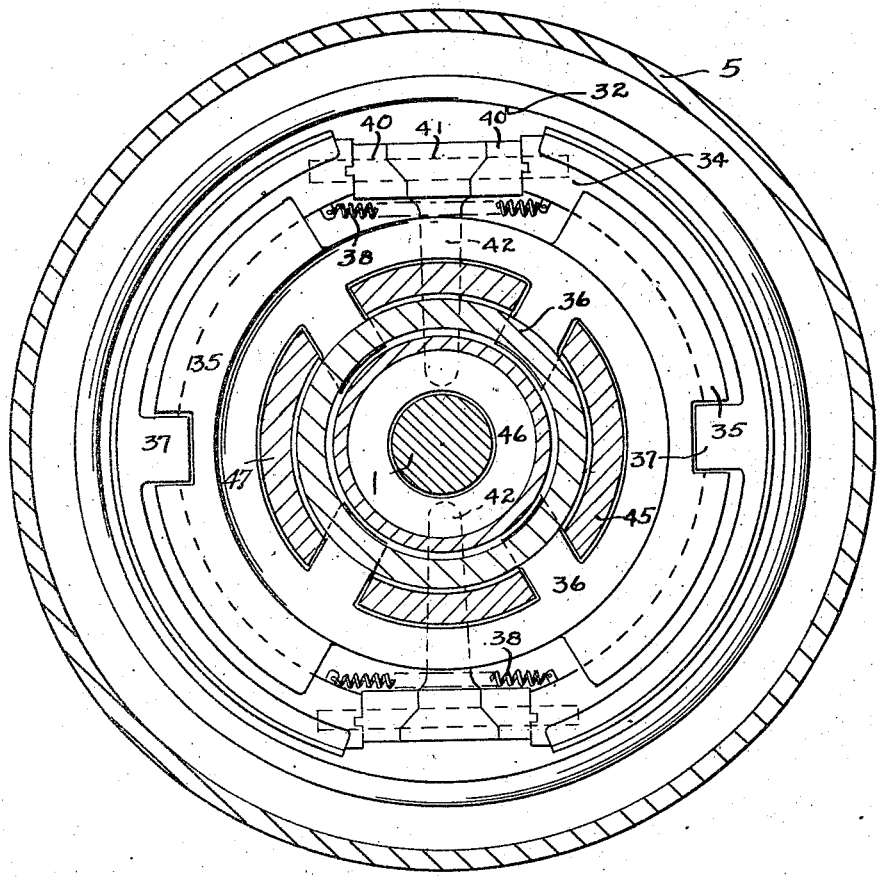

In the drawings Fig. 1 is a substantially axial section through my gearing, Fig. 2 is a transverse section taken along the line 2—2 on Fig. 1.

Designating the various parts by the use of reference characters a shaft which may be adapted to be connected to and disconnected from the engine and which may be termed the driving member is indicated at 1; 2 is the driven member adapted to be connected, in the form shown, with the propeller shaft leading to the rear axle. A suitable casing is shown as comprising parts 4 and 5 secured together by suitable flanges embracing the flange of the spider or bearing support member 6, the right hand portion of the casing being shown as suitably flanged at 8 for convenient attachment to the parts, such as to the bell-housing or crank case.

Referring briefly to the essential elements as shown in this figure P is a pinion rigid on the driving shaft 1; $P^1$ is an internal gear formed on the composite gear member, having also an external gear $P^2$ rigid therewith. This composite gear member has been referred to as the internal external gear and preferably is carried upon separate bearings designated 12, having their support on the rotatable eccentric bearing member 15 shown as surrounding the driving member. The gear $P^2$ is shown as meshing with an internal gear $P^3$ rigid with a suitable flanged member 18, which is in turn rigid with the propeller shaft. This gear $P^3$ will be referred to as the propeller gear.

The means for holding the composite gear against rotation yet permitting it to revolve, by reason of the free rotation of its bearing 15, includes a wheel 20 having a brake surface at 24 and a hub member 21. Offset crank members designated 27 each having bearings in a flange 28 rigid with the composite gear and in the web of the brake wheel 20 connect the composite gear to the wheel. The offset of these cranks corresponds to the amount of eccentricity of the eccentric bearing whereby they may revolve idly when the bearing is held stationary or may positively prevent relative rotation between the composite gear and the casing while permitting the gear to revolve when a brake 25 is applied to the exterior of the wheel 20.

For another condition, it is desired to control or stop the rotation of the eccentric bearing. I have shown means for accomplishing this comprising a friction clutch one member of which is carried by the eccentric. The other member may for the present purposes be considered as capable of being held stationary, as though attached to the casing. I have however shown it as being adapted to connect with one of a pair of armatures of an electric transmission, such as shown in my prior Patent No. 1,515,322. By reason of such connection, the bearing 15 may be held against rotation or independently rotated. For the present purpose it will be assumed that such armature or equivalent means has no function other than to hold the bearing stationary. The bearing 15 is shown as having a tubular portion 30 to which is splined, or otherwise rigidly secured, a counterweighted wheel 31. The wheel has an interior clutching surface 32 which cooperates with expanding members 33. I have shown two of these members each having inwardly projecting tongues 34 which rest in channel shaped guides 35 carried by a spider 36 which may be assumed to be rigid with the armature referred to. Means such as radial tongues 37 project into recesses in the spider and prevent relative radial shifting of the members 33 and the spider, while tension springs 38 hold the clutching surfaces of these members 33 normally separated from the surface 32.

To operate the clutch I have shown beveled ended thrust members 40 and 41 the latter being provided with inwardly extending arms 42. It will be apparent from Fig. 2 that a rearward swinging of these arms will operate to engage the clutch. I have shown a cup shaped member 45 having a central opening in its bottom portion 46 for the shaft 1 and separated brim portions 47, extending forwardly through openings in the spider member, which are embraced by a shifting collar 48 arranged to cooperate with an arm 49. To operate upon this cup member I have shown a compression spring 50 bearing against a portion of the spider at one end and against the bottom of the cup member 45 at the other wherefore the arm 49 acts merely to hold the spring inactive which will upon being released push rearwardly on the arms 42 to operate the clutch and stop or hold the eccentric against rotation.

The above described mechanism may be operated to effect either a reduced forward speed or a still slower reverse condition of rotation between the engine shaft and propeller.

It will be easily seen that I may also employ the clutching mechanism which I have shown to connect the driving or driven shaft with the eccentric and thus drive direct, that is with all the parts locked together and traveling at the same speed. This however would necessitate providing a modified construction whereby the eccentric bearing might also be held stationary when a simple reduction of speed of the propeller is desired in the same direction as the engine shaft. Such a construction is illustrated in my copending application, Ser. No. 758,940.

In the proportions shown and assuming a constant engine speed, the first condition of rotation may be that at which the propeller is idle, that is with the brake 25 released and the clutch member 45 withdrawn as shown. The pinion P now drives the composite gear at a reduced forward speed with the gear $P^2$ simply circulating about the gear $P^3$ without driving it. The eccentric now rotates backward at an increased speed in taking the reaction.

Now if the brake member is released into engagement with the wheel 31, the eccentric will be gradually slowed down and stopped and a second condition will obtain. The gear P would drive the gear $P^2$ at a reduced speed and the gear $P^2$ would drive the propeller at a still further reduced speed.

For a third condition the brake 25 is applied and the clutch 45 released. The composite gear then simply revolves on its bearing without rotating. Because of the geared connection ($P^2$, $P^3$) the gear teeth of $P^3$ are now pushed along by the revolving composite gear in the direction in which the eccentric rotates, namely reverse to that of the engine shaft. I have found the proportions shown give a slow enough reverse condition to be very satisfactory.

From the foregoing description it will be seen that I have provided a very compact gearing which may be easily manufactured and assembled and which is capable of speed changes and "idling" without the usual attendant clashing of gears. I am aware that gearing employing a circulating and rotating internal-external gear is old in various combinations but I believe that shown herein to be new, and I do not wish to limit the scope of my invention to mere details of construction.

Having thus described my invention, I claim:

1. In a gearing, in combination, a driving member having a pinion, a driven member, a composite gear in mesh with said pinion and surrounding one of said members, an eccentric bearing for said gear capable of independent rotation relative to the driving member and of being held against rotation, a driven member having a geared connection with said composite gear, means for preventing the rotation of said composite gear while permitting it to revolve upon the eccentric bearing when the bearing is free to rotate for transmitting one speed to the driven member, and means including an expanding friction clutch for holding the eccentric bearing for an additional speed.

2. In a transmission gearing, in combination, a driving member, a driven member, a rotatable and revoluble composite gear in offset axial relation thereto and having a geared connection with both of said members, a bearing for said gear capable of rotating freely and of being held against rotation, means including a manually actuated friction mechanism arranged to constrain the movement of said bearing for imparting a given rotation to said driven member through said gear members, and means including a brake member and a series of cranks pivoted to the brake member and composite gear, for preventing the rotation of said composite gear while permitting it to circulate about its bearing for imparting a reverse rotation to said driven member.

3. In a transmission gearing, in combination, a driving member, a driven member, an eccentric bearing member surrounding a portion of one of said members, a rotatable and revoluble composite gear mounted on said bearing and having a geared connection with both said driving and driven members, brake operated means for controlling the rotating movement of the composite gear while permitting the revolution thereof for effecting a reverse rotation of the driven member, cooperating friction members, one being rigid with the eccentric bearing, and means for operating the friction members to control the movement of the eccentric bearing for effecting a forward rotation of said driven member.

4. In a gearing of the class described, an internal-external reduction gear, a relatively rotatable eccentric bearing for supporting said gear, a driving member and a driven member each having a geared connection with the internal-external gear, a clutch member carried by said bearing and rigid therewith, a cooperating clutch member arranged to prevent relative rotation between the bearing and cooperating member, a plurality of friction shoes carried by said cooperating clutch member, operating means therefore including shoe operating arms and a normally retracted spring adapted to react against said arms when released.

5. In a gearing, in combination, a driving member having a pinion, a composite gear member in mesh with said pinion, an eccentric bearing member for said gear arranged to rotate and to be held relatively stationary, a driven member having a geared connection to said composite gear, a normally inactive spring operated clutch for holding the eccentric bearing against rotation for imparting a reduced speed to said driven member and means for retarding the rotation of said gear while permitting it to revolve upon the eccentric bearing, when the bearing is free to rotate, for effecting reverse rotation of the driven member.

In testimony whereof, I hereunto affix my signature.

CHARLES E. F. AHLM.